(12) United States Patent
Kumar et al.

(10) Patent No.: US 12,271,066 B2
(45) Date of Patent: Apr. 8, 2025

(54) ELECTROACTIVE OPTICAL DEVICE

(71) Applicant: PPG Industries Ohio, Inc., Cleveland, OH (US)

(72) Inventors: Anil Kumar, Murrysville, PA (US); Eric Michael King, Trafford, PA (US); Truman Frank Wilt, Clinton, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 17/462,162

(22) Filed: Aug. 31, 2021

(65) Prior Publication Data

US 2023/0066064 A1     Mar. 2, 2023

(51) Int. Cl.
*G02F 1/01*     (2006.01)
*G02F 1/13363*     (2006.01)
(Continued)

(52) U.S. Cl.
CPC ...... *G02F 1/0136* (2013.01); *G02F 1/133638* (2021.01); *G02F 1/13439* (2013.01); *G02F 1/1503* (2019.01); *G02F 1/1514* (2019.01); *G02F 1/155* (2013.01); *G02F 1/157* (2013.01); *G02F 2202/043* (2013.01); *G02F 2203/01* (2013.01)

(58) Field of Classification Search
CPC .............. G02F 1/15; G02F 2001/1502; G02F 2001/15025; G02F 1/1503; G02F 1/1506; G02F 1/1508; G02F 1/1514; G02F 2001/15145; G02F 1/1516; G02F 1/15165; G02F 2001/1517; G02F 2001/1518; G02F 1/1523; G02F 1/1524; G02F 1/1525; G02F 1/13725; G02F 1/134363; G02F 1/134372
See application file for complete search history.

(56) References Cited

U.S. PATENT DOCUMENTS

| 4,902,108 A | 2/1990 | Byker |
| 5,550,661 A | 8/1996 | Clark et al. |

(Continued)

FOREIGN PATENT DOCUMENTS

| JP | 2011-170231 A | 9/2011 |
| JP | 2017-509031 A | 3/2017 |

(Continued)

*Primary Examiner* — Alexander P Gross
(74) *Attorney, Agent, or Firm* — Krisanne Shideler

(57) ABSTRACT

An electroactive optical device that includes an optical substrate; a layer that includes an electroactive material capable of linearly polarizing electromagnetic radiation; at least two transparent electrodes, spaced one from the other, and each independently in contact with the layer containing the electroactive material; a source capable of applying an electric potential between the at least two electrodes; and a birefringent layer. Electromagnetic radiation transmitting through the device includes a first polarization state in the absence of an electrical potential between the at least two electrodes and the electromagnetic radiation transmitting through the device includes a second polarization state that is different from the first polarization state, in the presence of an electrical potential between the at least two electrodes. The electroactive optical device is operable to circularly polarize or elliptically polarize transmitted radiation.

31 Claims, 4 Drawing Sheets

(51) Int. Cl.
   *G02F 1/1343*   (2006.01)
   *G02F 1/1503*   (2019.01)
   *G02F 1/1514*   (2019.01)
   *G02F 1/155*    (2006.01)
   *G02F 1/157*    (2006.01)

(56) References Cited

U.S. PATENT DOCUMENTS

| | | |
|---|---|---|
| 5,948,487 A | 9/1999 | Sahouani et al. |
| 6,020,987 A | 2/2000 | Baumann et al. |
| 6,864,932 B2 | 3/2005 | Miyatake et al. |
| 7,256,921 B2 | 8/2007 | Kumar et al. |
| 8,077,373 B2 | 12/2011 | Kumar et al. |
| 8,809,678 B2 | 8/2014 | Sager et al. |
| 10,114,266 B2 | 10/2018 | Kumar et al. |
| 10,243,044 B2 | 3/2019 | Cheng et al. |
| 10,294,415 B2 | 5/2019 | Vasiliev et al. |
| 10,344,208 B2 | 7/2019 | Vasiliev et al. |
| 10,678,068 B2 | 6/2020 | Linhardt et al. |
| 10,698,285 B2 | 6/2020 | Vasiliev et al. |
| 10,785,851 B2 | 9/2020 | Liu et al. |
| 10,955,719 B2 | 3/2021 | Franz et al. |
| 2009/0135462 A1* | 5/2009 | Kumar .................. G02F 1/1335 359/321 |
| 2014/0049731 A1* | 2/2014 | Park .................. G02F 1/134363 445/24 |
| 2015/0261056 A1* | 9/2015 | Kumar .................. G02F 1/155 359/275 |
| 2016/0070132 A1* | 3/2016 | Soto .................. G02F 1/13725 349/193 |
| 2016/0326008 A1* | 11/2016 | Koh .................. C23C 16/45553 |
| 2019/0230345 A1* | 7/2019 | Zuo .................. G02F 1/13725 |
| 2020/0278566 A1* | 9/2020 | Yoshida .................. B60J 3/06 |

FOREIGN PATENT DOCUMENTS

| | | |
|---|---|---|
| JP | 2019-070779 A | 5/2019 |
| JP | 2021-500611 A | 1/2021 |
| KR | 10-2014-0024636 A | 3/2014 |
| WO | 2018/196374 A1 | 1/2018 |
| WO | 2018/148414 A1 | 8/2018 |
| WO | 2020/032942 A1 | 2/2020 |

* cited by examiner

ELECTROACTIVE OPTICAL DEVICE

FIELD

This disclosure generally relates to electroactive optical devices and methods of making such devices.

BACKGROUND

Conventional, linearly polarizing elements, such as linearly polarizing lenses for sunglasses and linearly polarizing filters, are typically formed from stretched polymer sheets containing a dichroic material, such as a dichroic dye.

SUMMARY

This disclosure describes an electroactive optical device that includes an optical substrate; a layer that includes an electroactive material capable of linearly polarizing electromagnetic radiation; at least two transparent electrodes, spaced one from the other, and each independently in contact with the layer containing the electroactive material; a source capable of applying an electric potential between the at least two electrodes; and a birefringent layer. Electromagnetic radiation transmitting through the device includes a first polarization state in the absence of an electrical potential between the at least two electrodes and the electromagnetic radiation transmitting through the device includes a second polarization state that is different from the first polarization state, in the presence of an electrical potential between the at least two electrodes. The electroactive optical device can be operable to circularly polarize or elliptically polarize transmitted radiation.

DETAILED DESCRIPTION

Figure 1:
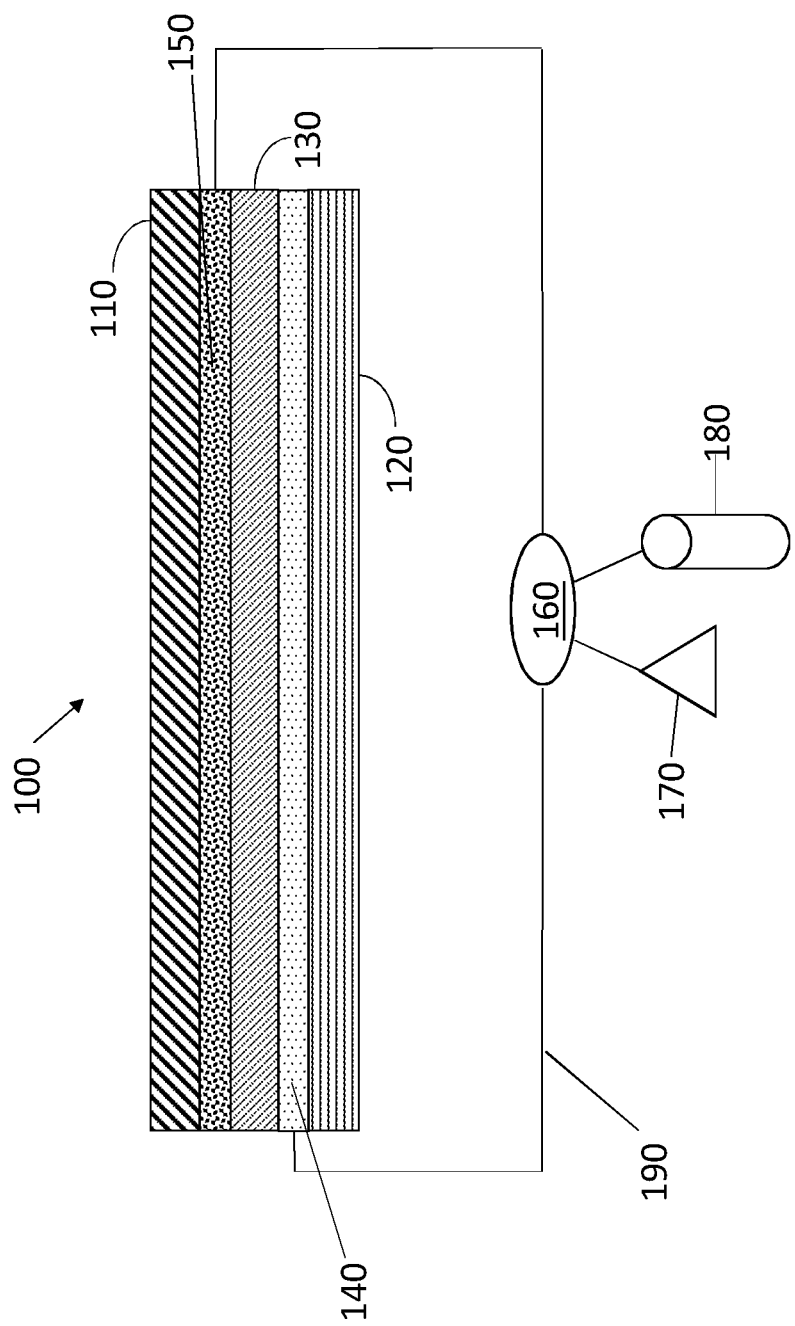
FIG. 1 shows a sectional view of an electroactive device as described herein.

Unless otherwise indicated, conditions of temperature and pressure are ambient temperature (22° C.), a relative humidity of 30%, and standard pressure of 101.3 kPa (1 atm).

Unless otherwise indicated, any term containing parentheses refers, alternatively, to the whole term as if parentheses were present and the term without them, and combinations of each alternative. Thus, as used herein the term, "(meth)acrylate" and like terms is intended to include acrylates, methacrylates and their mixtures.

It is to be understood that this disclosure may assume various alternative variations and step sequences, except where expressly specified to the contrary. Accordingly, unless indicated to the contrary, the numerical parameters set forth in the following specification and attached claims are approximations that can vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

All ranges are inclusive and combinable. For example, the term "a range of from 0.06 to 0.25 wt. %, or from 0.06 to 0.08 wt. %" would include each of from 0.06 to 0.25 wt. %, from 0.06 to 0.08 wt. %, and from 0.08 to 0.25 wt. %. Further, when ranges are given, any endpoints of those ranges and/or numbers recited within those ranges can be combined within the scope of the present invention.

As used herein, unless otherwise expressly specified, all numbers such as those expressing values, ranges, amounts or percentages can be read as if prefaced by the word "about", even if the term does not expressly appear. Unless otherwise stated, plural encompasses singular and vice versa. As used herein, the term "including" and like terms means "including but not limited to". Similarly, as used herein, the terms "on", "applied on/over", "formed on/over", "deposited on/over", "overlay" and "provided on/over" mean formed, overlay, deposited, or provided on but not necessarily in contact with the surface. For example, a coating layer "formed over" a substrate does not preclude the presence of one or more other coating layers of the same or different composition located between the formed coating layer and the substrate.

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the disclosure.

As used herein, the term "electroactive material" refers to a material that has a response to electrical stimuli.

As used herein, the articles "a", "an", and "the" include plural references unless expressly and unequivocally limited to one referent.

As used herein, the term "alignment facility" refers to refers to the predominant arrangement and/or direction of a material, compound or structure in a material, medium and/or layer.

As used herein, the term "anisotropic material" refers to a material that has at least one property that differs in value when measured in at least on different direction.

As used herein, the term "anode" refers to an electrode through which a conventional current enters into an electrical device.

As used herein, the term "birefringent" refers to the optical property of a material having a refractive index that depends on the polarization and propagation direction of light.

As used herein, the term "birefringent layer" refers to a layer, coating or laminate having birefringent properties.

As used herein, the term "block copolymer" refers to copolymers where the repeat units exist only in long sequences, or blocks, of the same type.

As used herein, the term "circularly polarize" refers to two perpendicular electromagnetic plane waves of equal amplitude and 90° difference in phase, as a nonlimiting example, when light is composed of two plane waves of equal amplitude but differing in phase by 90°, then the light is said to be circularly polarized.

As used herein, the term "dichroic material" refers to a material capable of absorbing one of two orthogonal plane polarized components of at least transmitted radiation more strongly than the other.

As used herein, the term "cathode" refers to an electrode through which a conventional current leaves an electrical device.

As used herein, the term "coating layer" refers to the result of applying one or more coating compositions on a substrate in one or more applications of such one or more coating compositions.

As used herein the term "compound" refers to a substance formed by the union of two or more elements, components, ingredients, or parts and includes, without limitation, molecules and macromolecules (for example polymers and oligomers) formed by the union of two or more elements, components, ingredients, or parts.

As used herein, the terms "conjugated polymers" and "conjugated copolymers" refer to organic macromolecules that are characterized by a backbone chain of alternating double- and single-bonds. Their overlapping p-orbitals create a system of delocalized 7c-electrons, which can result in useful optical and electronic properties As used herein, the term "electroactive optical device" refers to a device that has variable light transmittance in response to the magnitude of an applied electrical potential or voltage.

As used herein, the term "electric potential" refers to the amount of work needed to move a unit charge from a reference point to a specific point against an electric field.

As used herein, the term "electrode" refers to a conductor through which electricity enters or leaves an object or substance.

As used herein, the term "electrochromic material" refers to materials that are able to vary their coloration and/or transparency to radiation, in a reversible manner, when they are subjected to an electric field.

As used herein, the term "electrochromic-dichroic material" refers to an electroactive material that includes a single compound that can be both electrochromic and dichroic in response to an applied electric potential or voltage, that can cause a color change, as a nonlimiting example from clear to colored.

As used herein the term "electromagnetic radiation" refers to the waves of the electromagnetic field, propagating through space, carrying electromagnetic radiant energy. Nonlimiting examples include radio waves, microwaves, infrared light, visible light, ultraviolet light, X-rays, and gamma rays.

As used herein, the term "elliptically polarize" refers to electromagnetic radiation that includes two perpendicular waves of unequal amplitude which differ in phase by 90°.

As used herein, the term "lamination" refers to producing a composite system by using two or more materials stacked in layers.

As used herein, the term "Langmuir-Blodgett film" refers to partially ordered molecular films on a surface.

As used herein, the term "layer" refers to a thickness of some material laid on, spread, or applied over a surface of another material.

As used herein, the term "linearly polarizing" refers to confining the vibrations of an electric vector of light waves to one direction or plane.

As used herein, the term "liquid crystal" refers to a state of matter which has properties between those of conventional liquids and those of solid crystals. As a nonlimiting example, a liquid crystal can flow like a liquid, but its molecules can be oriented in a crystal-like way.

As used herein, the term "optical substrate" refers to a substrate made of materials that are usually understood to be transparent, in other words, materials with good light transmission, in at least some spectral ranges, exhibiting little absorption and scattering of light. Nonlimiting examples include glass, such as fused silica and fused quartz, which can include alkali-aluminosilicate glass such as that used as touch screens for hand-held electronic devices.

As used herein, the term "orientation facility" refers to a mechanism that can facilitate the positioning of one or more other structures that are exposed, directly and/or indirectly, to at least a portion thereof. As a nonlimiting example, an orientation facility can facilitate orientation or alignment of dichroic materials and/or anisotropic materials to effectuate polarization.

As used herein, the terms "oxidation—reduction reaction" and "redox" refer to reactions that are characterized by the actual or formal transfer of electrons between chemical species, often with one species undergoing oxidation while another species undergoes reduction.

As used herein, the term "photo-orientation material" refers to a material that can undergo a photochemically induced domain rearrangement driven by destabilization of a liquid-crystalline phase in light absorbing domains.

As used herein, the term "polarization" refers to electromagnetic waves that travel only in a single plane. As a nonlimiting example, the process of transforming unpolarized light waves to polarized light waves is called the polarization of light.

As used herein, the term "polarization efficiency" refers to the percentage of how efficiently one polarizer. polarizes incident light over the total amount of polarized light. As a nonlimiting example, a linear polarizer with 99% efficiency transmits 99% of the incident light in the intended polarization (p-polarization state) and 1% in the opposite.

As used herein, the term "polymer" includes homopolymers (formed from one monomer) and copolymers and block copolymers that are formed from two or more different monomer reactants or that include two or more distinct repeat units. Further, the term "polymer" includes prepolymers, and oligomers.

As used herein, the term "polymeric gel layer" refers to a semi-solid coating that includes a polymer that can have properties ranging from soft and weak to hard and tough.

As used herein, the term "quarter-wave retarder" refers to an optical device that alters the polarization state of a light wave travelling through it. As a nonlimiting example, a quarter-wave plate, can convert linearly polarized light into circularly polarized light and vice versa. In another nonlimiting example, a quarter-wave plate can convert linearly polarized light into elliptically polarized light and vice versa.

As used herein, the term "rubbed-orientation material" refers to a material that can be at least partially ordered by rubbing at least a portion of a surface of the material with another suitably textured material.

As used herein, the term "self-assembling material" refers to a material that self-organizes, as nonlimiting examples, the lamella stacks driven by the repulsive interactions between blocks in a block copolymer and crystal formation, as a nonlimiting example, alignment of molecules in liquid crystals.

As used herein, the term "short circuit" refers to an electrical circuit of lower resistance than that of a normal circuit, typically resulting from the unintended contact of components and consequent accidental diversion of the current.

As used herein the term "transitional coating" refers to a coating that aids in creating a gradient in properties between two coatings.

As used herein, the term "transparent" refers to allowing light to pass through a material so that objects behind can be distinctly seen. As nonlimiting examples, the term "substantially transparent" seeing a surface at least partially visible to the naked eye when viewed through the material and the term "fully transparent" refers seeing to a surface as completely visible to the naked eye when viewed through the material.

As used herein, the term "transmitted radiation" refers to radiation that is passed through at least a portion of an object.

As used herein, the term "viologen" refers to organic compounds with the formula $(C_5H_4NR)_2^{n+}$.

As used herein, the term "voltage" refers to the difference in electric potential between two points.

This disclosure describes an electroactive optical device that includes an optical substrate; a layer that includes an electroactive material capable of linearly polarizing electromagnetic radiation; at least two transparent electrodes spaced one from the other and each independently in contact with the electroactive material layer; a source capable of applying an electric potential between the at least two electrodes; and a birefringent layer. Electromagnetic radiation transmitting through the device includes a first polarization state in the absence of an electrical potential between the at least two electrodes and the electromagnetic radiation transmitting through the device includes a second polarization state that can be different from the first polarization state, in the presence of an electrical potential between the at least two electrodes. The electroactive optical device can be operable to circularly polarize or elliptically polarize transmitted radiation.

Optical Substrate

The optical substrate can include any of a wide variety of substrates suitable for use in optical devices. As nonlimiting examples, the substrate can include glass such as fused silica and fused quartz. Such glass substrates can include, as nonlimiting examples, alkali-aluminosilicate glass such as that used as touch screens for hand-held electronic devices.

As other nonlimiting examples, the optical substrate can include polymeric substrate materials. Suitable polymeric substrates can include, without limitation, polycarbonate, polystyrene, polyurethane, polyurethane(urea), polyester, polyacrylate, polymethacrylate, poly(cyclic) olefin, polyepoxy, copolymers thereof, or mixtures of any of the foregoing. The polymeric substrates can include a combination of any of the foregoing substrates, as a nonlimiting example, in the form of a multilayer laminate. The polymeric substrates can be formed by any manufacturing means known in the art such as by casting or molding, a nonlimiting example being injection molding techniques. In a nonlimiting example, the polymeric substrate can include polycarbonates, poly(cyclic) olefins, polystyrenes, polyurethanes, polymethacrylates, co-polymers of any of the foregoing materials, or mixtures of any of the foregoing.

Nonlimiting examples of suitable optical substrates can include a polymeric film (i.e., a thin but self-supporting polymeric film) such as those know for use in the manufacture of optical devices. Nonlimiting examples of such polymeric films can include any of a variety of thermoset and thermoplastic materials provided that the material is transparent or optically clear. As nonlimiting examples, the polymeric film can include polycarbonate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), poly(ethylene naphthalate), polyester, polysulfone, polyolefin, copolymers thereof, or combinations of said films, as a nonlimiting example in multilayer or laminate constructions.

When the optical substrate is a film, the film thickness can be at least 20 µm, such as at least 40 µm and at least 50 µm and can be up to 1000 µm, such as up to 500 µm and up to 250 µm. The optical substrate film thickness can be from 20 µm to 1000 µm, such as from 40 µm to 500 µm and from 50 µm to 250 µm. The optical substrate film thickness can be any value or range between (and include) any of the values recited above.

Film thickness can be determined by cross-sectioning a film, multi-layer film and/or device and measuring the thickness of each layer using a scanning electron microscope.

The optical substrate can include untinted substrates, tinted substrates, photochromic substrates, tinted-photochromic substrates, and linearly polarizing substrates.

Electro Active Materials

As indicated above, the electroactive optical device can include at least one electroactive material layer in contact with the at least two electrodes. The electroactive material layer can be in the form of a polymeric coating layer which includes an electroactive material, or in the form of a gel which includes an electroactive material. The electroactive material can be capable of linearly polarizing electromagnetic radiation.

The electroactive material layer can include an electrochromic material (which includes electrochromic-dichroic materials). The electrochromic material used to form the electroactive material layer can include any of the electrochromic compounds known in the art, including, as nonlimiting examples, phenazine compounds, such as dihydrophenazine compounds, and/or dipyridinium (viologen) compounds. Suitable non-limiting examples of such phenazine compounds and the preparation thereof can include those described in U.S. Pat. No. 6,020,987 at column 31, line 43, column 34, line 7, and in U.S. Pat. No. 4,902,108 at column 13, line 49 to column 15, line 42, the specific cited portions of which are incorporated herein by reference. Suitable non-limiting examples of viologen compounds include those described in U.S. Pat. No. 6,020,987 at column 34, line 8-55, the specific cited portion incorporated herein by reference. As a nonlimiting example, the electroactive material can include an electrochromic-dichroic material.

The film thickness of the electroactive material layer can be at least 1 µm, such as at least 5 µm, at least 10 µm and at least 20 µm and can be up to 1000 µm, such as up to 500 µm and up to 250 µm. The film thickness of the electroactive material layer can be from 1 µm to 1000 µm, such as from 5 µm to 500 µm and from 10 µm to 250 µm. The film thickness of the electroactive material layer can be any value or range between (and include) any of the values recited above.

In a nonlimiting example, the electrochromic-dichroic material includes a stretched polyaniline film, a stretched polypyrrol film, a stretched polythiophene film, a viologen, and/or a dichroic dye in liquid crystal.

In nonlimiting examples, the layer that includes the electroactive material includes a polymeric coating layer or a polymeric gel layer.

The electroactive material layer can include anodic electrochromic dyes. Nonlimiting examples of suitable anodic electrochromic dyes can include to 5,10-dihydro-5,10-dimethylphenazene, N,N,N',N'-tetramethyl-1,4-phenylenediamine, 10-methylphenothiazine, 10-ethylphenothiazine, tetrathiafulvalene, ferrocene and derivatives thereof, and/or triarylamines and derivatives thereof.

The electroactive material layer can include cathodic electrochromic dyes. Nonlimiting examples of suitable cathodic electrochromic dyes can include 1,1'-diphenyl-4,4'-bipyridinium difluoroborate, 1,1'-di(n-heptyl)-4,4'-bipyridinium difluoroborate, 1,1'-dibenzyl-4,4' bipyridinium defluoroborate, and/or 1,1'-di(n-propylphenyl)-4,4'-bipyridinium difluoroborate. As nonlimiting examples, the electrochromic materials can include certain Prussian blue systems as well as conductive polymers such as poly (thiophenes) such as poly(3,4-ethylenedioxythiophene) often referred to as "PEDOT."

The electrochromic material also can include other materials such as solvents, light absorbers, light stabilizers, thermal stabilizers, antioxidants, thickeners or viscosity modifiers, and free standing gel, including polymer matrices.

When the electrochromic material includes a solvent, nonlimiting examples include propylene carbonate, benzonitrile, phenoxyacetonitrile, diphenyl acetonitrile, sulfolane, sulfolate, and/or phosphoramide. Nonlimiting examples of other useful solvents can include phosphoric esters such as tricresyl phosphate, cresyl phosphate and the like, amides such as N,N-di-methylformamide, methylpropionamide, N-methylpyrrolidone, hexamethylphosphonamide, diethylformamide, tetramethylurea and the like, nitriles such as acetonitrile, sulfoxides such as dimethylsulfoxide, esters such as ethyl acetate, butyl acetate, dioctyl phthalate and the like, carbonates such as propylene carbonate, ethylene carbonate and the like, lactones such as γ-butyrolactone, ketones such as methyl ethyl ketone, methyl isobutyl ketone and the like. Any of the solvents indicated above can be used singly or in any combination.

The electrochromic material can include an electrolyte, nonlimiting examples of which include tetrabutylammonium tetrafluoroborate and/or tetrabutylammonium bromide. The electrolyte can provide ionic conductivity to the material. Electrolyte materials suitable for this purpose are well known in the art.

The electrochromic material also can include metal oxides, nonlimiting examples include $WO_3$, $MoO_3$, $V_2O_5$, $Nb_2O_5$ and the like. Deposition of such materials can require vacuum evaporation, sputtering, or other vapor deposition processes. The electrochromic process in metal oxides can involve the electrochemical switch to a non-stoichiometric redox state that corresponds to an electrochromic absorption band due to optical intervalence charge transfer.

The electrochromic material can include conjugated polymers and copolymers that are capable of accessing multiple redox states. The π-conjugated organic polymers can provide mechanical flexibility, and easily tuned band-gap color via structural and functionality control.

As a nonlimiting example, the layer that includes an electroactive material includes a self-assembling material. Nonlimiting examples of suitable self-assembling materials include liquid crystal materials, liquid crystalline electrochromic-dichroic materials, and block copolymers.

Optionally, the electroactive material layer can include a dichroic material. Non-limiting examples of suitable dichroic materials can include azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone, (poly)anthroquinones, anthropyrimidinones, iodine, and/or iodates. The dichroic material also can include a polymerizable dichroic compound. That is, the dichroic material can include at least one group that is capable of being polymerized (i.e., a "polymerizable group"). As a nonlimiting example the dichroic compound can have at least one alkoxy, polyalkoxy, alkyl, or polyalkyl substituent terminated with at least one polymerizable group.

Electrodes

The electroactive optical device can include at least two electrodes spaced one from the other and in contact with at least one surface of the electroactive material layer, which can be a flat planar surface, or a surface having a curvature. The electrodes can include a transparent conductive material such as any of those discussed herein. The transparent conductive material used to form the electrodes can be applied directly onto an optical substrate surface. Any type of barrier coatings, primer coatings or adhesion promoting layers known in the art of optical devices can be applied to the optical substrate and/or electroactive material layer surface provided the overall optical properties of the device are not adversely affected by such application and the electrodes are in contact with the electroactive material layer.

The transparent conductive material used to form the electrodes can be applied to the optical substrate surface such that the electrodes conform to the surface topography. As a nonlimiting example, if the optical substrate surface is a flat planar surface, the electrodes are "in-plane" with and disposed directly on the flat planar surface. As another non-limiting example, if the optical substrate surface is a surface having a curvature, then the electrodes conform to the curvature and are disposed directly on the curved surface.

The transparent conductive material used to form the electrodes can be applied by a variety of patterning techniques known in the art. Nonlimiting examples of suitable techniques can include lithography (including, inter alia, contact photolithography, microscope projection photolithography, and microlens array reduction photolithography), silk printing, etching roll-to-roll processes, and ink jet printing techniques. A combination of any of the aforementioned techniques can also be used. As nonlimiting examples, the transparent conductive materials can be applied by chemical vapor deposition, spray pyrolysis, pulsed laser deposition, metal organic molecular beam deposition, sputter deposition, chemical assisted vapor deposition, aerosol assisted vapor deposition, metal organic chemical vapor deposition, magnetron sputtering, field assisted magnetron sputtering, pulsed direct current sputtering, and the like.

As a nonlimiting example, the transparent conductive materials can be applied in multilayers or "stacks" of conductive materials to form the at least two electrodes, as a nonlimiting example, the electrode can include a stack of conductive materials applied in succession such as indium tin oxide/silver/indium tin oxide.

As a nonlimiting example, the patterning techniques selected for the transparent conductive material used to form the electrodes on the surface of the substrate will be dependent upon the particular substrate employed. The use of polymeric substrates could require patterning techniques that do not demand high processing temperatures.

As a nonlimiting example, the electroactive material layer can have an optical substrate disposed over at least a portion of opposite surfaces of the electroactive material layer with one or more electrodes also disposed on each opposite surface of the electroactive material layer and the one or more electrodes in contact with an optical substrate and the electroactive material layer. The electrodes can be in the form of a continuous layer or a pattern layer.

As a nonlimiting example, the patterning of the transparent conductive materials to form the at least two electrodes includes the formation of bus bar patterns on the substrate.

The electrodes can be spaced one from the other so as to prevent a short circuit from occurring during operation of the device. Any pattern can be used to form the electrodes provided that upon application of an electric potential or voltage there is no short circuit, and there is sufficient current flowing through the electroactive material in contact with the electrodes to effectuate the desired electroactive response.

The conductive material used to form the at least two electrodes can be selected, as nonlimiting examples, from any of those widely known in the field of electrochromic devices. Nonlimiting examples of transparent conductive materials can include those selected from carbon nanotubes, graphene platelets, gold, tin oxide, fluorine-doped tin oxide, indium tin oxide, and/or one or more conductive polymers. The foregoing conductive materials can be present in polymeric coatings, where applicable, which are patterned to form the at least two electrodes. Non-limiting examples of suitable conductive polymers can include poly(acetylene), poly(pyrrole), poly(thiophene), poly(aniline), poly(fluorene), poly(pyridene), poly(indole), poly(carbazole), poly(azine), poly(quinone), poly(3-alkylthiophene), polytetrathiafulvalene, polynaphthalene, poly(p-phenylene sulfide), and/or poly(para-phenylene vinylene).

In a nonlimiting example, the electroactive material produces a color change through an oxidation—reduction reaction when an electric potential is applied to the two or more electrodes. As a nonlimiting example, the color change includes a dichroic color change.

The film thickness of the electrodes can be at least 0.05 µm, such as at least 0.1 µm, at least 0.3 µm and at least 0.5 µm and can be up to 1000 µm, such as up to 20 µm, up to 5 µm and up to 3 µm. The film thickness of the electrodes can be from 0.05 µm to 1000 µm, such as from 0.1 µm to 20 µm, from 0.3 µm to 5 µm and from 0.5 µm to 3 µm. The film thickness of the electrodes can be any value or range between (and include) any of the values recited above.

Power Source

The electroactive optical device includes a source capable of applying an electric potential or voltage. As a nonlimiting example, a controller can be configured to activate when an electric potential or voltage is required to be applied to the electrodes. As nonlimiting examples, one or more inputs such as optical sensors, temperature sensors, or a switch can be in communication with the controller. The controller can receive input information from the one or more inputs and can be configured to determine whether the power source used to provide an electric potential or voltage to the should be provided. As nonlimiting examples, the power source can be a battery, a transformer converting conventional AC or DC current to an acceptable level, a photovoltaic medium, a capacitor, a super capacitor, and combinations thereof. The external power supply can be electrically coupled to the controller and one or more inputs and can be configured to provide electric potential or voltage to the electrodes. More than one supply can be implemented in the electroactive optical device. The power source, controller, sensors, switches and/or electrodes can be connected by wires or other means known in the art.

The electroactive optical device can have a variable light transmittance in response to the magnitude of an applied voltage. Generally, the at least two electrodes (formed from transparent conductive material) disposed on the surface of the electroactive layer serve as counter-conducting electrodes in electrical communication with a controller which can be operable to energize the electroactive material layer by applying an electrical potential or voltage to the electrodes.

In the presence of an applied electric potential or voltage, the electroactive material layer reversibly changes from a first polarization state to a second polarization state.

The first polarization state in the electroactive layer demonstrates little to no absorption in the visible spectral region, i.e., between 410 nm and 800 nm., whereas the second polarization state in the electroactive layer exhibits a visible color change as well as increased polarization.

In the first polarization state (in the absence of an applied electric potential or voltage), the polarization efficiency can be zero and can be up to 15%, such as up to 10% and up to 5%. The polarization efficiency of the first polarization state can be any value or range between (and include) and value recited above.

The second polarization state (in the presence of an electrical potential or voltage) demonstrates a polarization efficiency of at least 60%, such as at least 75%; and at least 85% and can be up to 100%, such as up to 99%, up to 95% and up to 90%. The polarization efficiency of the second polarization state can be any value or range between (and include) and value recited above.

Birefringent Layer

The birefringent layer is a layer having a function of imparting a phase difference to electromagnetic radiation passing through the electroactive optical device. The material used to prepare the birefringent layer can be any birefringent material known in the art. As nonlimiting examples, a polymer film, a liquid crystal film, self-assembling materials, or a film in which a liquid crystal material is aligned may be used. Nonlimiting examples of particular birefringent layers include those described in U.S. Pat. No. 6,864,932 at column 3, line 60 to column 4, line 64; U.S. Pat. No. 5,550,661 at column 4, line 30 to column 7, line 2; U.S. Pat. No. 5,948,487 at column 7, line 1 to column 10, line 10, each of which is specifically incorporated herein by reference.

Nonlimiting examples of birefringent films include film Model No. NRF-140, a positively birefringent, uniaxial film available from Nitto Corporation, Japan, or Nitto Denko America, Inc., New Brunswick, N.J. Also suitable are OPTI-GRAFIX circular polarizer films, available from GRAFIX Plastics, a division of GRAFIX, Inc., Cleveland, Ohio.

Nonlimiting examples of specific polymeric sheets used to prepare the birefringent layer can include poly(meth) acrylates, poly($C_1$-$C_{12}$) alkyl (meth)acrylates, polyoxy(alkylene (meth)acrylates), poly (alkoxylated phenol (meth) acrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), poly(vinylpyrrolidone), poly((meth) acrylamide), poly(dimethyl acrylamide), poly(hydroxyethyl methacrylate), poly((meth)acrylic acid), thermoplastic polycarbonates, polyesters, polyurethanes, polythiourethanes, poly(ethylene terephthalate), polystyrene, poly(alpha methyl styrene), copoly(styrene-methylmethacrylate), copoly(styrene-acrylonitrile), polyvinylbutyral and polymers that include polyol(allyl carbonate)monomers, monofunctional (meth)acrylate monomers, polyfunctional (meth) acrylate monomers, diethylene glycol di(meth)acrylate monomers, diisopropenyl benzene monomers, alkoxylated polyhydric alcohol monomers and diallylidene pentaerythritol monomers; and self-assembling materials such as, polycarbonate, polyamide, polyimide, poly(meth)acrylate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, polyalkene, polyalkylene-vinyl acetate, poly(vinylacetate), poly(vinyl alcohol), poly(vinyl chloride), poly (vinylformal), poly(vinylacetal), poly(vinylidene chloride), poly(ethylene terephthalate), polyester, polysulfone, polyolefin, copolymers thereof, and/or mixtures thereof.

The birefringent layer can include a resin that includes an oriented crystalline resin. The oriented crystalline resin can be a polyester. Nonlimiting examples of the polyester include ethylene terephthalate units and/or ethylene naphthalate units. As a nonlimiting example, the polyester for the birefringent layer can include a naphthalenedicarboxylic acid component as a dicarboxylic acid component. Nonlimiting examples of the naphthalenedicarboxylic acid component include 2,6-naphthalenedicarboxylic acid and 2,7-naphthalenedicarboxylic acid. As a nonlimiting example, the polyester for the birefringent layer can include a terephthalic acid component and an isophthalic acid component.

The birefringent layer can include, as nonlimiting examples, a birefringent film formed of an inorganic material. The inorganic material can be a dielectric material, nonlimiting examples including inorganic oxides including at least one of Si, Nb, Zr, Ti, La, Ta, Al, Hf, and Ce. As a nonlimiting examples, the inorganic oxide can be tantalum oxide ($Ta_2O_5$).

The birefringent layer can be oriented such that the orientation of the layer is at an angle relative to the polarization axis of the electroactive material. The orientation angle can be at least 30°, such as at least 35° and at least 40° and can be up to 60°, such as up to 55° and up to 50° relative to the linear polarization axis of the electroactive material. The orientation angle can be 45° relative to the linear polarization axis of the electroactive material. The birefringent layer can be oriented at any angle or range between (and include) any of the angles recited above.

The film thickness of the birefringent layer can be at least 1 μm, such as at least 10 μm, at least 25 μm and at least 40 μm and can be up to 500 μm, such as up to 300 μm, up to 200 μm and up to 100 μm. The film thickness of the birefringent layer can be from 1 μm to 500 μm, such as from 10 μm to 300 μm, from 25 μm to 200 μm and from 25 μm to 100 μm. The film thickness of the birefringent layer can be any value or range between (and include) any of the values recited above.

As a nonlimiting example, the birefringent layer includes a quarter-wave retarder.

Alignment Materials

It should be noted that while dichroic materials are capable of preferentially absorbing one of two orthogonal plan polarized components of transmitted radiation, if the molecules of the dichroic material are not suitably positioned (i.e., oriented), no net linear polarization of transmitted radiation will be achieved. That is, due to the random positioning of the molecules of the dichroic material, selective absorption by the individual molecules will cancel each other such that no net or overall linear polarizing effect is achieved. Therefore, it generally is necessary to suitably position or arrange the molecules of the dichroic material by alignment with another material in order to achieve a net linear polarization.

The electroactive optical device can include an alignment and/or orientation facility to facilitate orientation or alignment of the electrochromic-dichroic material and/or the anisotropic material to effectuate linear polarization. Non-limiting examples of suitable alignment and/or orientation facilities can include those described in U.S. Pat. No. 7,256,921, at column 67, line 7 to column 71, line 65, the specific cited portions of which are incorporated by reference herein. As a nonlimiting example, the electroactive optical device can include at least one orientation facility. As a nonlimiting example, the electroactive material can include an at least partially aligned electrochromic-dichroic material.

As a nonlimiting example, the alignment or orientation facility includes a photo-orientation material, a rubbed-orientation material, a liquid crystal material, an electric field, a magnetic field, an at least partially ordered polymer sheet, an at least partially treated surface, and/or a Langmuir-Blodgett film.

Additional Coating Layers

The electroactive optical device of the present invention can include one or more protective coatings, such as hard coats and/or abrasion-resistant coatings, anti-reflective ("AR") coatings, antifogging coatings, oxygen barrier coatings and/or infra-red (IR) absorbing coatings and/or IR reflective coatings, and/or conventional reflective coatings. Note that the coatings can, but need not, cover an entire surface of the electroactive material layer, and/or the surface of the optical substrate, which can be opposite the surface including the electroactive layer and the electrodes.

Suitable non-limiting examples of AR coatings can include a monolayer coating or multi-layer coating of metal oxides, metal fluorides, or other such materials, which can be deposited onto the outer surface(s) of substrates or, alternatively onto self-supporting films that can be applied to the substrate outer surface(s), through application means such as vacuum deposition and sputtering techniques as are well known in the art. Suitable non-limiting examples of IR reflective coatings can include very thin, partially transparent metallic layers such as NiCr and/or or gold layers applied, for example, by PVD metallization methods. Such materials and application means are available from Creavac Vakuumbeschechtung GmbH of Dresden, Germany. Suitable examples of IR reflective coatings (e.g., Laser Gold and Laser Black) also are available from Epner Technology, Inc. Also, suitable IR reflective coatings can include the silver-based coatings available under the tradename AgHT™, and the gold-based coating available under the tradename AuARE™, from CPFilms Inc. of Canoga Park, Calif. Suitable non-limiting examples of IR absorbing coatings are coatings which include IR absorbing dye materials, for example, those which are photochemically stable under ambient light conditions, and which absorb light within the near-IR region of the spectrum, for example, 5,5'-dichloro-11-diphenylamino-3,3'-diethyl-10,12-ethylenethiatricarbocya-nine perchlorate (which provides peak IR absorption at about 830 nm); 2,4 di-3-guaiazulenyl-1,3-dihydroxycyclobutenediylium dihydroxide, bis(inner salt) (which provides peak IR absorption about 780 to about 800 nm); and 1-butyl-2-[2-[3[(1-butyl-6-chlorobenz[cd]indol-2(1H)-ylidiene)ethylidene]-2-chloro-5-methyl-1-cyclohexen-1-yl]ethenyl]-6-chlorobenz[cd]indolium tetrafluoroborate (which provides peak IR blocking at about 900 to about 1000 nm).

Transitional coatings can be used in the electroactive optical device. As a nonlimiting example, a transitional coating can aid in creating a gradient in hardness between a relatively hard coating and a relatively soft coating. Nonlimiting examples of transitional coatings include radiation-cured acrylate-based thin films.

Suitable examples of protective coatings can include, but are not limited to, abrasion-resistant coatings that include organo silanes, abrasion-resistant coatings including radiation-cured acrylate-based thin films, abrasion-resistant coatings based on inorganic materials such as silica, titania and/or zirconia, organic abrasion-resistant coatings of the type that are ultraviolet light curable, oxygen barrier-coating, UV-shielding coatings, and combinations thereof. As a nonlimiting example, the protective coating can include a first coating of a radiation-cured acrylate-based thin film and a second coating including an organo-silane. Non-limiting examples of commercially available protective coating products include SILVUE® 124 and HI-GARD® coatings, available from SDC Coatings, Inc. and PPG Industries, Inc., respectively.

The electroactive optical device can include additional coating layers interposed between any of the substrate surface and the at least two electrodes, or the at least two electrodes and the electroactive layer provided, however, that the electrodes remain in electrical communication with the electroactive layer. Any of the aforementioned coatings can be used for this purpose, as well as barrier coatings and/or primer layers.

The circular and/or elliptical polarization of the optical device can correspond with the degree of linear polarization of the electroactive layer in the first polarization state and the second polarization state.

The electroactive optical device can be useful as or in the production of display devices, optical articles such as optical lenses, including ophthalmic (prescription) and plano (non-prescription), contact lenses, intra-ocular lenses, magnifying lenses, protective lenses and visors, display articles (including, for example, touch screens and security elements), windows, mirrors, and both active and passive liquid crystal cells.

In nonlimiting examples, the display device includes the electroactive optical device described herein and can include an augmented reality display, a screen display, a virtual reality display, and/or a monitor display.

As shown in FIG. 1 (not drawn to scale), electroactive optical device 100 includes optical substrate 120, electroactive layer 130 and birefringent layer 110. Electroactive layer 130 includes an electroactive material capable of polarizing electromagnetic radiation. Cathode layer 140 is disposed over at least a portion of a first surface of electroactive layer 130 and anode layer 150 is disposed over at least a portion of a second surface of electroactive layer 130. Controller 160 is in electrical communication with cathode layer 140 and anode layer 150. Controller 160 receives inputs from input 170, which communicate how much, if any, electric potential or voltage is to be applied between cathode layer 140 and anode layer 150. Voltage source 180 provides the electric potential or voltage to controller 160 as required. When an electric potential or voltage is to be applied between cathode layer 140 and anode layer 150 electroactive layer 130 transitions from a first polarization state (no applied electric potential or voltage) to a second polarization state. Generally, incident light will pass through electroactive layer 130 before passing through birefringent layer 110.

Figure 2:
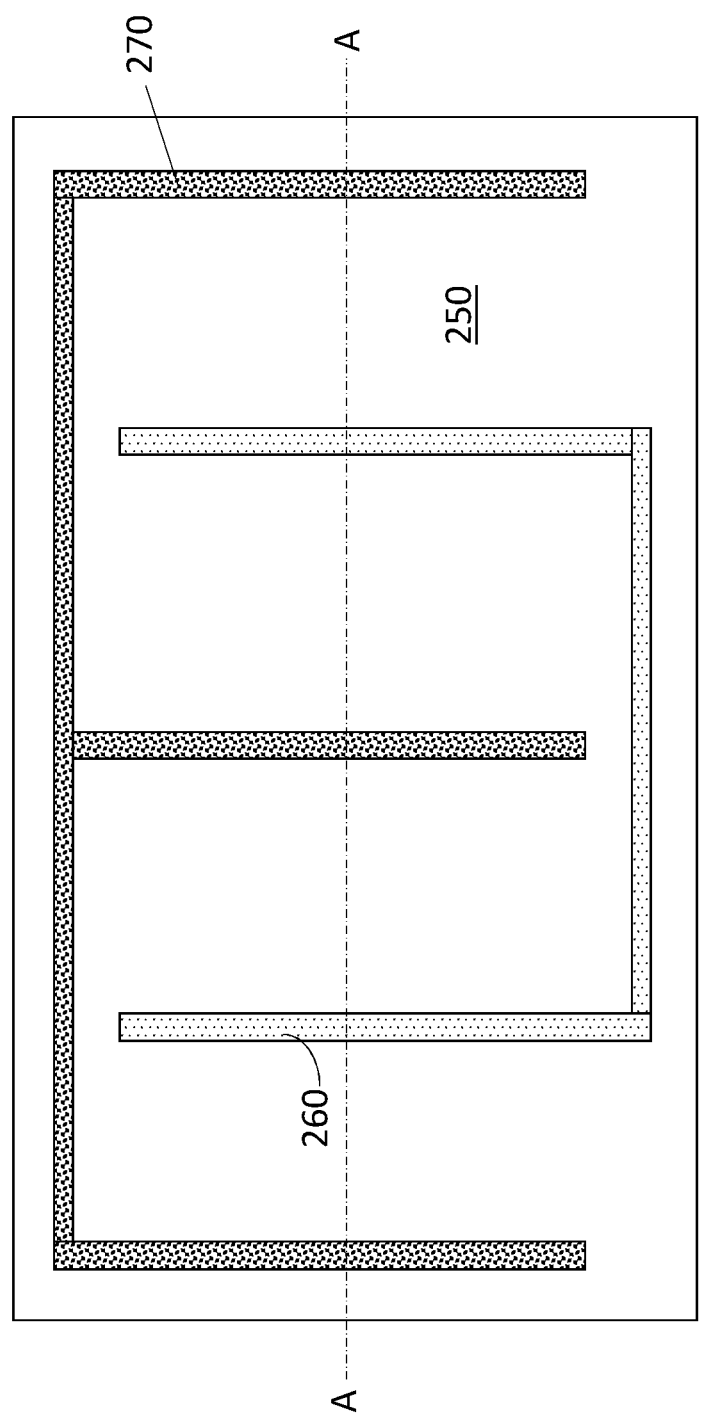
FIG. 2 shows a plan view of an electroactive active layer of an electroactive device having a pattern anode and a pattern cathode as described herein.

As shown in FIG. 2 (not drawn to scale), a pattern anode layer 270 is disposed over a portion of a surface of electroactive layer 250 and a pattern cathode layer 260 is disposed over a portion of a surface of electroactive layer 250.

Figure 3:
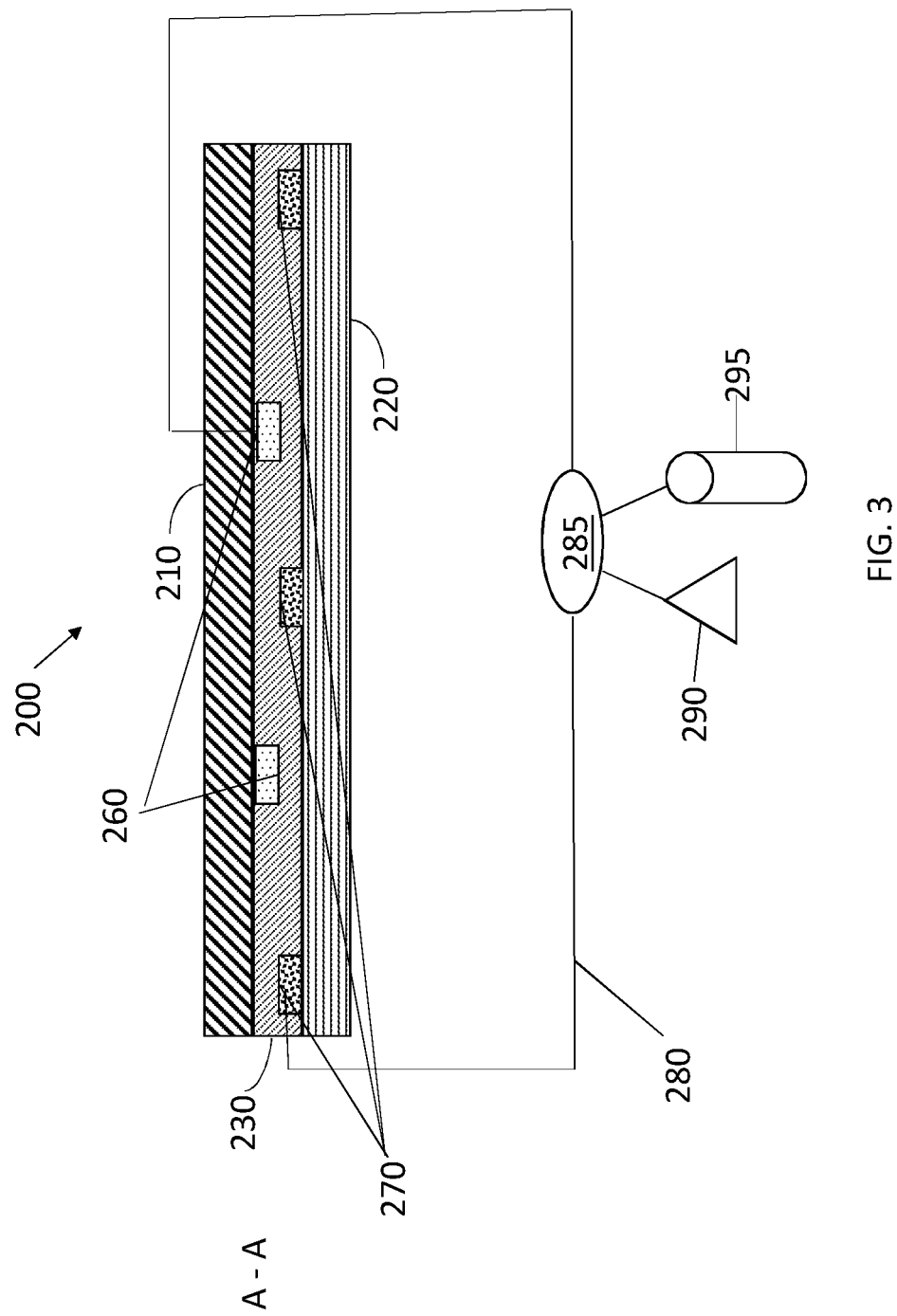
FIG. 3 shows a sectional view along the line A-A of FIG. 2 of an electroactive device having a pattern anode and a pattern cathode as described herein.

As shown in FIG. 3 (not drawn to scale), electroactive optical device 200 includes optical substrate 220, birefringent layer 210, and electroactive layer 230. Pattern anode layer 270 is disposed over a portion of a surface of electroactive layer 230 that interfaces with a surface of optical substrate 220. The surfaces of anode layer 270 not in contact with optical substrate 220 are in contact with electroactive layer 230. Pattern cathode layer 260 is disposed over a portion of a surface of electroactive layer 230 that interfaces with a surface of birefringent layer 210. The surfaces of cathode layer 260 not in contact with birefringent layer 210 are in contact with electroactive layer 230. Controller 285 is in electrical communication with cathode layer 260 and anode layer 270. Controller 285 receives inputs from input 290, which communicate how much, if any, electric potential or voltage is to be applied between cathode layer 260 and anode layer 270 via line 280. Voltage source 295 provides the electric potential or voltage to controller 285 as required. When an electric potential or voltage is to be applied between cathode layer 260 and anode layer 270, electroactive layer 230 transitions from a first polarization state (no applied electric potential or voltage) to a second polarization state. Generally, incident light will pass through electroactive layer 230 before passing through birefringent layer 210.

Figure 4:
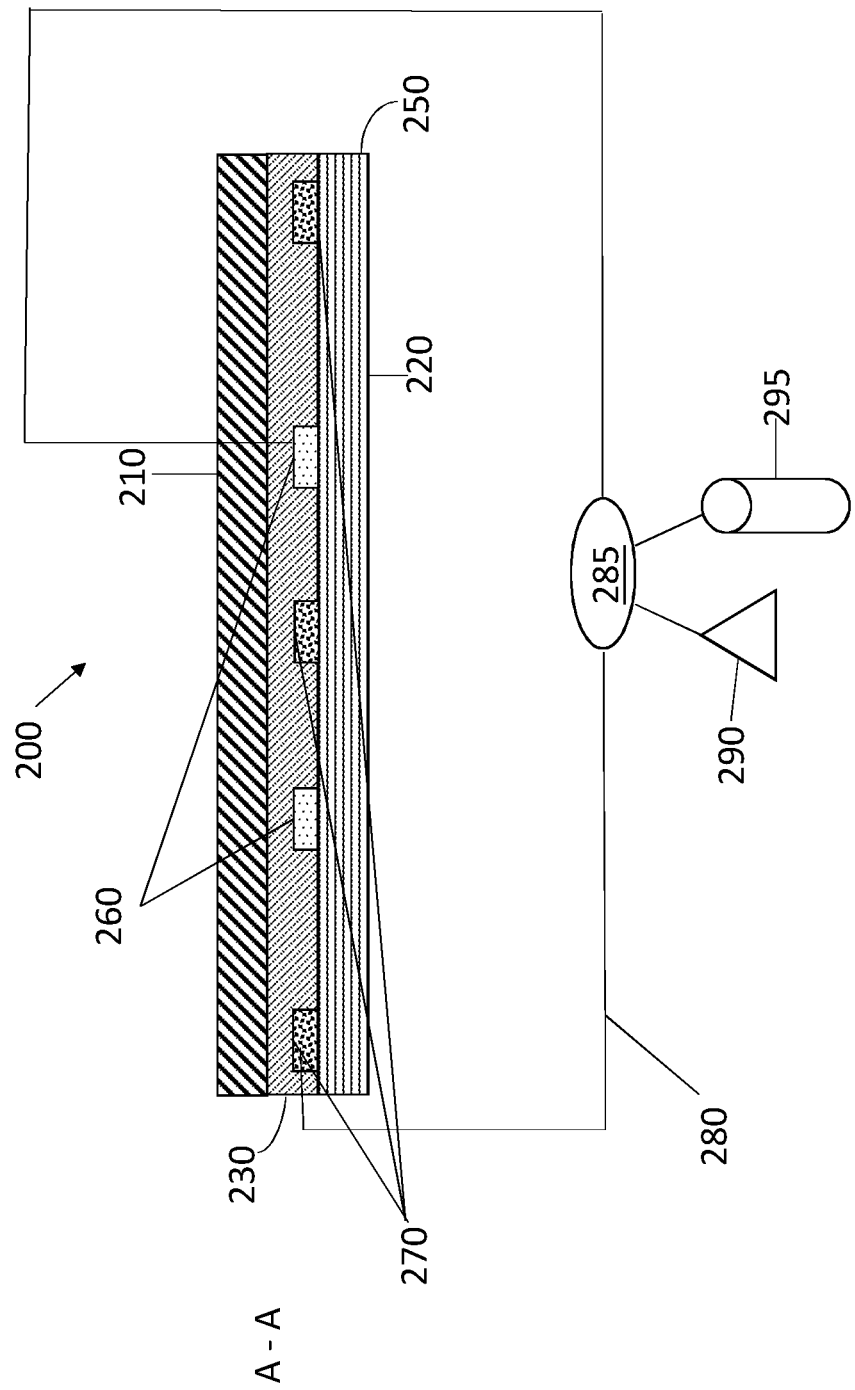
FIG. 4 shows an alternate sectional view along the line A-A of FIG. 2 of an electroactive device having a pattern anode and a pattern cathode as described herein.

As shown in FIG. 4 (not drawn to scale), electroactive optical device 200 includes optical substrate 220, birefringent layer 210, and electroactive layer 230. Pattern anode layer 270 and pattern cathode layer 260 are each disposed over a portion of a surface of electroactive layer 230 that interfaces with a surface of birefringent layer 210. The surfaces of anode layer 270 and pattern cathode layer 260 not in contact with birefringent layer 210 are in contact with electroactive layer 230. Controller 285 is in electrical communication with cathode layer 260 and anode layer 270 via line 280. Controller 285 receives inputs from input 290, which communicate how much, if any, electric potential or voltage is to be applied between cathode layer 260 and anode layer 270. Voltage source 295 provides the electric potential or voltage to controller 285 as required. When an electric potential or voltage is to be applied between cathode layer 260 and anode layer 270, electroactive layer 230 transitions from a first polarization state (no applied electric potential or voltage) to a second polarization state. Generally, incident light will pass through electroactive layer 230 before passing through birefringent layer 210.

This disclosure is also directed to methods of making a multilayer optical device that includes:

a) applying a layer that includes an electroactive material capable of linearly polarizing electromagnetic radiation over at least a portion of a surface of an optical substrate, the layer includes an electroactive material having a first surface and a second surface directly opposite the first surface;

b) applying at least two transparent electrodes spaced one from the other and each independently in contact with at least one of the first surface or the second surface of the layer that includes the electroactive material; and c) applying a birefringent layer;

where a source capable of applying an electric potential between the at least two electrodes is in electric communication with the at least two electrodes.

The method uses the electroactive materials, transparent electrodes, birefringent layer and power sources described above and, as nonlimiting examples, as shown in FIGS. 1-4. The method can also include applying an orientation or alignment facility as described above.

In a nonlimiting example, the at least one transparent electrode can be applied to the optical substrate or electroactive material layer using vapor deposition techniques known in the art.

In nonlimiting examples, the birefringent layer can be applied as a coating or by lamination and can include a quarter-wave retarder.

In nonlimiting disclosures herein described, when ambient conditions are not excessively bright or excessive reflections are not present, an electric potential to the two or more electrodes may not be required from the power source. However, the readability of a display can be greatly improved by applying an electric potential to the electroactive optical device described herein in bright or direct sunlight conditions. As described herein, the load on the power supply can be reduced to "on demand" only when reduced reflection or glare is desired. Nonlimiting examples of devices include windows, cameras, camcorders, cell phones, augmented reality devices, virtual reality devices and the like.

ASPECTS

Aspect 1 is directed to an electroactive optical device that includes:
(a) an optical substrate;
(b) a layer comprising an electroactive material capable of linearly polarizing electromagnetic radiation;
(c) at least two transparent electrodes spaced one from the other and each independently in contact with the layer comprising the electroactive material;
(d) a source capable of applying an electric potential between the at least two electrodes; and
(e) a birefringent layer;
where electromagnetic radiation transmitting through the device includes a first polarization state in the absence of an electrical potential between the at least two electrodes;
where the electromagnetic radiation transmitting through the device includes a second polarization state that is different from the first polarization state, in the presence of an electrical potential or voltage between the at least two electrodes; and
where the electroactive optical device is operable to circularly polarize and/or elliptically polarize transmitted radiation.

Aspect 2. The electroactive optical device according to Aspect 1, that includes at least one orientation facility.

Aspect 3. The electroactive optical device according to either of Aspects 1 or 2, where the electroactive material is capable of linearly polarizing electromagnetic radiation.

Aspect 4. The electroactive optical device according to any of Aspects 1 through 3, where the electroactive material includes an electrochromic-dichroic material.

Aspect 5. The electroactive optical device according to any of Aspects 1 through 4, where the electroactive material includes an at least partially aligned electrochromic-dichroic material.

Aspect 6. The electroactive optical device according to any of Aspects 1 through 5, where the layer that includes the electroactive material includes a self-assembling material.

Aspect 7. The electroactive optical device of Aspect 6 wherein the self-assembling material includes a liquid crystal material, a liquid crystalline electrochromic-dichroic material, and/or a block copolymer.

Aspect 8. The electroactive optical device according to any of Aspects 1 through 7, wherein the layer that includes the electroactive material includes a polymeric coating layer or a polymeric gel layer.

Aspect 9. The electroactive optical device according to any of Aspects 1 through 8, where at least one of the at least two transparent electrodes acts as an anode and at least one of the at least two transparent electrodes acts as a cathode.

Aspect 10. The electroactive optical device according to any of Aspects 1 through 9, where the electroactive material produces a color change through an oxidation—reduction reaction when an electric potential is applied to the electroactive material.

Aspect 11. The electroactive optical device according to Aspect 10, where the color change includes a dichroic color change.

Aspect 12. The electroactive optical device according to any of Aspects 1 through 11, where the birefringent layer includes a quarter-wave retarder.

Aspect 13. The electroactive optical device according to any of Aspects 2 through 12, where the orientation facility includes a photo-orientation material, a rubbed-orientation material, a liquid crystal material, an electric field, a magnetic field, an at least partially ordered polymer sheet, an at least partially treated surface, and/or a Langmuir-Blodgett film.

Aspect 14. The electroactive optical device according to any of Aspects 3 through 13, where the electrochromic-dichroic material includes a single compound which is both electrochromic and dichroic in response to an applied electric potential.

Aspect 15. The electroactive optical device according to any of Aspects 1 through 14, where the layer that includes the electroactive material includes a first major surface and a second major surface directly opposite the first major surface.

Aspect 16. The electroactive optical device according to Aspect 15, where the at least two transparent electrodes are in direct contact with the first major surface of the layer that includes the electroactive material.

Aspect 17. The electroactive optical device according to Aspect 16, where a first electrode of the at least two transparent electrodes is in contact with the first major surface of the layer that includes the electroactive material, and where a second electrode of the at least two transparent electrodes is in direct contact with the second major surface of the layer that includes the electroactive material.

Aspect 18. The electroactive optical device according to according to any of Aspects 3 through 17, where the electrochromic-dichroic material includes a stretched polyaniline film, a stretched polypyrrol film, a stretched polythiophene film, a viologen, and/or a dichroic dye in liquid crystal.

Aspect 19. The electroactive optical device according to according to any of Aspects 1 through 18, where the circular or elliptical polarization of the optical device corresponds with the degree of linear polarization of the electroactive layer in the first polarization state and the second polarization state.

Aspect 20. A display device that includes the electroactive optical device according to any of Aspects 1 through 19.

Aspect 21. The display device according to Aspect 20, where the display device includes an augmented reality display, a screen display, a virtual reality display, and/or a monitor display.

Aspect 22 is directed to a method of making a multilayer optical device that includes:
a) applying a layer that includes an electroactive material capable of linearly polarizing electromagnetic radiation over at least a portion of a surface of an optical substrate, the layer containing an electroactive material and having a first surface and a second surface directly opposite the first surface;
b) applying at least two transparent electrodes spaced one from the other and each independently in contact with the first surface or the second surface of the layer containing the electroactive material; and
c) applying a birefringent layer;
where a source capable of applying an electric potential between the at least two electrodes is in electric communication with the at least two electrodes.

Aspect 23. The method according to Aspect 22 that includes
d) applying an orientation facility.

Aspect 24. The method according to either of Aspects 22 or 23, where at least one transparent electrode is applied as a coating.

Aspect 25. The method according to any of Aspects 22 through 24, where at least one transparent electrode is applied by vapor deposition.

Aspect 26. The method according to any of Aspects 22 through 25, where the electroactive material includes an electrochromic-dichroic material.

Aspect 27. The method according to according to any of Aspects 22 through 26, where the birefringent layer is applied as a coating.

Aspect 28. The method according to according to any of Aspects 26 through 26, wherein the birefringent layer is applied by lamination.

Aspect 29. The method according to according to any of Aspects 22 through 28, where the birefringent layer comprises a quarter-wave retarder.

Aspect 30. The method according to any of Aspects 22 through 29, where the at least two transparent electrodes are in direct contact with the first major surface of the layer that includes the electroactive material.

Aspect 31. The method according to any of Aspects 22 through 29, where a first of the at least two transparent electrodes is in contact with the first major surface of the layer that includes the electroactive material, and where a second of the at least two transparent electrodes is in direct contact with the second major surface of the layer that includes the electroactive material.

Aspect 32. The device or method according to any of Aspects 1 through 31, where the optical substrate is a film and the film thickness is at least 20 µm, such as at least 40 µm and at least 50 µm and is up to 1000 µm, such as up to 500 µm and up to 250 µm; from 20 µm to 1000 µm, such as from 40 µm to 500 µm and from 50 µm to 250 µm. The optical substrate film thickness can be any value or range between (and include) any of the values recited above.

Aspect 33. The device or method according to any of Aspects 1 through 32, where the film thickness of the electroactive material layer is at least 1 µm, such as at least 5 µm, at least 10 µm and at least 20 µm and is up to 1000 µm, such as up to 500 µm and up to 250 µm; from 1 µm to 1000 µm, such as from 5 µm to 500 µm and from 10 µm to 250 µm. The film thickness of the electroactive material layer can be any value or range between (and include) any of the values recited above.

Aspect 34. The device or method according to any of Aspects 1 through 33, where the film thickness of the at least two transparent electrodes is at least 0.05 µm, such as at least 0.1 µm, at least 0.3 µm and at least 0.5 µm and is up to 1000 µm, such as up to 20 µm, up to 5 µm and up to 3 µm; from 0.05 µm to 1000 µm, such as from 0.1 µm to 20 µm, from 0.3 µm to 5 µm and from 0.5 µm to 3 µm. The film thickness of the electrodes can be any value or range between (and include) any of the values recited above.

Aspect 35. The device or method according to any of Aspects 1 through 34, where the film thickness of the birefringent layer is at least 1 µm, such as at least 10 µm, at least 25 µm and at least 40 µm and is up to 500 µm, such as up to 300 µm, up to 200 µm and up to 100 µm; from 1 µm to 500 µm, such as from 10 µm to 300 µm, from 25 µm to 200 µm and from 25 µm to 100 µm. The film thickness of the birefringent layer can be any value or range between (and include) any of the values recited above.

Aspect 36. The device or method according to any of Aspects 1 through 35, where in the first polarization state (in the absence of an applied electric potential or voltage), the polarization efficiency can be zero and can be up to 15%, such as up to 10% and up to 5%. The polarization efficiency of the first polarization state can be any value or range between (and include) and value recited above.

Aspect 37. The device or method according to any of Aspects 1 through 36, where the second polarization state (in the presence of an electrical potential or voltage) demonstrates a polarization efficiency of at least 60%, such as at least 75%; and at least 85% and can be up to 100%, such as up to 99%, up to 95% and up to 90%. The polarization efficiency of the second polarization state can be any value or range between (and include) and value recited above.

Whereas particular embodiments of this invention have been described above for purposes of illustration, it will be evident to those skilled in the art that numerous variations of the details of the present invention may be made without departing from the invention as defined in the appended claims.

We claim:
1. An electroactive optical device comprising:
(a) an optical substrate;
(b) a layer comprising an electroactive material capable of linearly polarizing electromagnetic radiation, wherein the layer is in the form of a polymeric coating layer which includes the electroactive material or a polymeric gel layer which includes the electroactive mate- rial, and wherein the electroactive material comprises an at least partially aligned electrochromic-dichroic material;
(c) at least two transparent electrodes spaced one from the other and each independently in contact with the layer comprising the electroactive material;
(d) a source capable of applying an electric potential between the at least two electrodes;
(e) a birefringent layer; and
(f) at least one orientation facility;
wherein electromagnetic radiation transmitting through the device comprises a first polarization state in the absence of an electrical potential between the at least two electrodes;
wherein the electromagnetic radiation transmitting through the device comprises a second polarization state that is different from the first polarization state, in the presence of an electrical potential between the at least two electrodes; and
wherein the electroactive optical device is operable to circularly polarize or elliptically polarize transmitted radiation.

2. The electroactive optical device according to claim 1, wherein the layer comprising the electroactive material comprises a self-assembling material.

3. The electroactive optical device of claim 2 wherein the self-assembling material comprises a liquid crystal material, a liquid crystalline electrochromic-dichroic material, and/or a block copolymer.

4. The electroactive optical device according to claim 1, wherein at least one of the at least two transparent electrodes act as an anode and at least one of the at least two transparent electrodes acts as a cathode.

5. The electroactive optical device according to claim 1, wherein the electroactive material produces a color change through an oxidation—reduction reaction when an electric potential is applied.

6. The electroactive optical device according to claim 5, wherein the color change comprises a dichroic color change.

7. The electroactive optical device according to claim 1, wherein the birefringent layer comprises a quarter-wave retarder.

8. The electroactive optical device according to claim 1, wherein the orientation facility comprises a photo-orientation material, a rubbed-orientation material, a liquid crystal material, an electric field, a magnetic field, an at least partially ordered polymer sheet, an at least partially treated surface, and/or a Langmuir-Blodgett film.

9. The electroactive optical device according to claim 1, wherein the electrochromic-dichroic material comprises a single compound which is both electrochromic and dichroic in response to an applied electric potential.

10. The electroactive optical device according to claim 1, wherein the layer comprising electroactive material comprises a first major surface and a second major surface directly opposite the first major surface.

11. The electroactive optical device according to claim 10, wherein the at least two transparent electrodes are in direct contact with the first major surface of the layer comprising the electroactive material.

12. The electroactive optical device according to claim 10, wherein a first electrode of the at least two transparent electrodes is in contact with the first major surface of the layer comprising the electroactive material, and wherein a second electrode of the at least two transparent electrodes is in direct contact with the second major surface of the layer comprising the electroactive material.

13. The electroactive optical device according to according to claim 1, wherein the electrochromic-dichroic material comprises a stretched polyaniline film, a stretched polypyrrol film, a stretched polythiophene film, a viologen, and/or a dichroic dye in liquid crystal.

14. The electroactive optical device according to according to claim 1, wherein the circular or elliptical polarization of the optical device corresponds with the degree of linear polarization of the electroactive layer in the first polarization state and the second polarization state.

15. The electroactive optical device according to according to claim 1, wherein the optical substrate is a film having a film thickness of from 20 µm to 1000 µm.

16. The electroactive optical device according to claim 1, wherein the film thickness of the electroactive material layer is from 1 µm to 1000 µm.

17. The electroactive optical device according to claim 1, wherein the film thickness of the at least two transparent electrodes is from 0.05 µm to 1000 µm.

18. The electroactive optical device according to claim 1, wherein the film thickness of the birefringent layer is from 1 µm to 500 µm.

19. The electroactive optical device according to claim 1, wherein in the first polarization state the polarization efficiency is from zero to 15%.

20. The electroactive optical device according to claim 1, wherein the second polarization state demonstrates a polarization efficiency of from 60% to 100%.

21. A display device comprising the electroactive optical device according to claim 1.

22. The display device according to claim 21, wherein the display device comprises an augmented reality display, a screen display, a virtual reality display, and/or a monitor display.

23. A method of making a multilayer optical device comprising:
a) applying a layer comprising an electroactive material capable of linearly polarizing electromagnetic radiation over at least a portion of a surface of an optical substrate, wherein the layer is in the form of a polymeric coating layer which includes the electroactive material or a polymeric gel layer which includes the electroactive material, and has a first surface and a second surface directly opposite the first surface, and wherein the electroactive material comprises an at least partially aligned electrochromic-dichroic material;
b) applying at least two transparent electrodes spaced one from the other and each independently in contact with the first surface or the second surface of the layer comprising the electroactive material; and
c) applying a birefringent layer and an orientation facility;
wherein a source capable of applying an electric potential between the at least two electrodes is in electric communication with the at least two electrodes.

24. The method according to claim 23, wherein at least one transparent electrode is applied as a coating.

25. The method according to claim 23, wherein at least one transparent electrode is applied by vapor deposition.

26. The method according to according to claim 23, wherein the birefringent layer is applied as a coating.

27. The method according to according to claim 23, wherein the birefringent layer is applied by lamination.

28. The method according to according to claim 23, wherein the birefringent layer comprises a quarter-wave retarder.

29. The method according to claim 23, wherein the at least two transparent electrodes are in direct contact with the first major surface of the layer comprising the electroactive material.

30. The method according to claim 23, wherein a first of the at least two transparent electrodes is in contact with the first major surface of the layer comprising the electroactive material, and wherein a second of the at least two transparent electrodes is in direct contact with the second major surface of the layer comprising the electroactive material.

31. An electroactive optical device comprising:
(a) an optical substrate;
(b) a layer comprising an electroactive material capable of linearly polarizing electromagnetic radiation and a self-assembling material, wherein the layer is in the form of a polymeric coating layer which includes the electroactive material and self-assembling material or a polymeric gel layer which includes the electroactive material and self-assembling material, and wherein the electroactive material comprises an at least partially aligned electrochromic-dichroic material;
(c) at least two transparent electrodes spaced one from the other and each independently in contact with the layer comprising the electroactive material;
(d) a source capable of applying an electric potential between the at least two electrodes; and
(e) a birefringent layer;

wherein electromagnetic radiation transmitting through the device comprises a first polarization state in the absence of an electrical potential between the at least two electrodes;

wherein the electromagnetic radiation transmitting through the device comprises a second polarization state that is different from the first polarization state, in the presence of an electrical potential between the at least two electrodes; and wherein the electroactive optical device is operable to circularly polarize or elliptically polarize transmitted radiation.

* * * * *